United States Patent [19]

Roddy et al.

[11] Patent Number: 4,965,599

[45] Date of Patent: Oct. 23, 1990

[54] SCANNING APPARATUS FOR HALFTONE IMAGE SCREEN WRITING

[75] Inventors: James E. Roddy; Badhri Narayan; Edward M. Granger, all of Rochester, N.Y.

[73] Assignee: Eastman Kodak Company, Rochester, N.Y.

[21] Appl. No.: 435,651

[22] Filed: Nov. 13, 1989

[51] Int. Cl.$^5$ .................... G01G 15/00; H04N 1/22
[52] U.S. Cl. ..................................... 346/160; 358/298
[58] Field of Search ............... 346/154, 160; 358/75, 358/80, 298, 300, 454

[56] References Cited

U.S. PATENT DOCUMENTS

| | | | |
|---|---|---|---|
| 4,185,304 | 1/1980 | Holladay | 358/298 |
| 4,730,221 | 3/1988 | Roetling | 358/300 X |
| 4,758,886 | 7/1988 | Rylander | 358/80 |
| 4,847,643 | 7/1989 | Ohmori | 346/160 |

Primary Examiner—Donald A. Griffin
Attorney, Agent, or Firm—Thomas H. Close

[57] ABSTRACT

Moiré patterns in raster-scanned halftone dots image screens generated by multi-element line scanner devices are rendered imperceptible to the human eye by selecting the number of elements in the line scanner device to be that number which makes the "once-around" scanner frequency an integral multiple of the halftone dot screen frequency and makes the beat frequencies between the scanner and frequencies either fall outside the nominal visible spatial frequency range of about 2.5 to 250 lines per inch or fall on the screen frequency.

5 Claims, 4 Drawing Sheets

SCANNING APPARATUS FOR HALFTONE IMAGE SCREEN WRITING

FIELD OF THE INVENTION

This invention relates to scanning apparatus adapted to generate raster scanned halftone image screens and more particularly to reduction of moiré banding in the generated image screen

BACKGROUND OF THE INVENTION

In the printing industry, halftone dot screen printing is used as a technique for creating images with varying levels of gray and color saturation and with varying color shades. With this technique, patterns of closely spaced tiny dots of ink of the appropriate color, or black, are deposited on paper or other printing surface to achieve the desired halftone screen. The dots are small enough and closely spaced enough as to be seen by the human eye at normal viewing distance as a continuous tone image when, in fact, it is a discontinuous image made up of thousands of dots. The varying levels of gray scale or color saturation are achieved by varying the sizes of the dots appropriately throughout the image, while the varying color shades are produced by superimposing the color and gray scale screens; the relative sizes of each color and black dot determining the composite shade of color or gray scale level.

One technique for electronically creating similar halftone images with varying dot sizes involves the subdivision of each dot into a matrix of pixel areas and to "build" a dot of the desired size by activating the appropriate number of pixels in the dot. An example of this is shown in FIGS. 1 and 2 wherein dot areas 10 are individually subdivided into a 12×12 matrix of pixel areas 11. In the illustrated example, a halftone image screen with 145 levels of gray or color saturation can be achieved either by leaving the dots blank or by activating from 1-144 of the pixels in each dot. The size of the dots and the number of pixel areas per dot is a matter of choice. Dot size determines the resolution or fineness of detail in the resulting image while the number of pixel areas in each dot determines the number of levels of gray and color saturation achievable in the image screen.

Various types of electronic scanning apparatus are known for creating a halftone image of the type described. For example, a single laser beam can be scanned repetitively by a line scanning mechanism across a target surface, which may be a photosensitive sheet, along horizontal rows or scan lines 12. The scan lines 12 are repeated progressively down the target surface in the cross-scan direction, either by deflecting the beam down by means of a galvano mirror or by moving the sheet up, thus creating a raster scan of the beam across the target surface. As the beam scans, digitized data signals representing the desired image screen are applied to turn the beam on and off thereby activating individual pixels 11a in each dot to create the desired pattern on the target surface. For definitional purposes, the resultant raster scanned image screen is described as having a spatial screen frequency given in dots per unit length which is equal to the reciprocal of the pitch between the centers of adjacent dots. Additionally, the spatial line scan frequency of the image screen is given in scan lines per unit length which is equal to the reciprocal of the pitch between the centers of vertically adjacent pixels. Line scan frequency can also be defined as the product of the number of pixels in the vertical direction (scan lines) times the screen frequency. Scanner apparatus contemplated by the present invention use multi-element line scanning devices to perform the raster scanning of the writing line across the target surface. Such devices may take the form of a multifaceted, rotating polygon mirror or a multifaceted, rotating holographic scan disk (hologon). With a single laser source, the lines are written one at a time. Alternatively, a plurality of scan lines can be written simultaneously with each horizontal traverse across the target surface by the line scanning device. Such a scanner may be a multi-laser source fiber optic scanner in which a vertical row of optical fibers moves plural writing beams across the target surface and the lines are written in parallel by suitably programmed image signals. Another example is an ink jet printer in which ink is squirted through a vertical row of apertures in a moving print head to deposit pixel sized ink dots on the target surface.

It has been found that the use of raster scanning as described above to generate halftone dot image screens can produce artifacts in the image referred to as moiré banding which are perceived as horizontal bands of intensity variation in the image. The cause of moiré banding lies in element-to-element nonuniformities in the line scanning device. These nonuniformities inject perturbations in the scanning beam at a repetition rate or frequency, as the raster scan progresses down the image screen, that beat with the halftone dot screen frequency to produce beat frequency perturbations that, in some cases, are visible as horizontal bands of intensity variation in the image. The spatial frequency and intensity of the moiré effect is dependent on the number and magnitude of the nonuniformities in the scanner. Although production of a completely uniform scanner will eliminate moiré banding, the expense and difficulty of producing such a device makes it impractical to rely on this as a solution to the problem of moiré banding.

It is therefore an object of the present invention to provide scanning apparatus for generating halftone dot image screens that eliminates moiré banding as a visible artifact in the resultant image.

It is a further object of the invention to provide scanning apparatus of the type described that makes moiré banding artifacts in the image imperceptible without incurring the cost and difficulty involved in making completely uniform scanning devices such as would be required to eliminate moiré banding artifacts entirely.

It is yet another object of the invention to reduce the perceptibility of moiré in scanning apparatus of a variety of different types of scanning apparatus, such as, for example, in polygon mirror scanners, hologon scanners, multi-source fiber optic scanners and ink jet scanner printers wherein multi- element line scanner pixel-writing devices are used to generate a raster scanned halftone dot image screen.

SUMMARY OF THE INVENTION

In carrying out the objects of the invention, there is provided improved scanning apparatus having a multi-element line scanner pixel-writing device adapted to produce a raster scanned halftone dot image screen in which each dot area in the halftone screen is comprised of a plurality of pixel areas in each scan line so that halftone dots of predetermined sizes are created by selective on-off control of the writing device as it repetitively line scans across the screen. The halftone screen contemplated by the invention has, in the cross-scan direction, (i) a predetermined dot screen spatial frequency and (ii) a scan line spatial frequency equal to the number of scan lines per dot times the spatial screen frequency, while the scanning apparatus has a spatial scanner frequency equal to the ratio of the scan line frequency divided by the number of elements in the line scan writing device.

In accordance with the invention, the improvement comprises the number of scanning elements being that number that makes either the scanner or the screen frequency an integral multiple of the other and makes sum and difference beat frequencies between the scanner frequency and screen frequency either fall outside the visible spatial frequency spectrum or be equal to the screen frequency thereby rendering cross-scan moiré banding in the image substantially imperceptible to the human eye. With scanning apparatus so configured, beat frequencies between the scanner and screen frequency components are not eliminated but are positioned so as to fall either on the screen frequency or outside the visible spatial frequency spectrum and thus are effectively hidden from the human eye.

DETAILED DESCRIPTION

Figure 3:
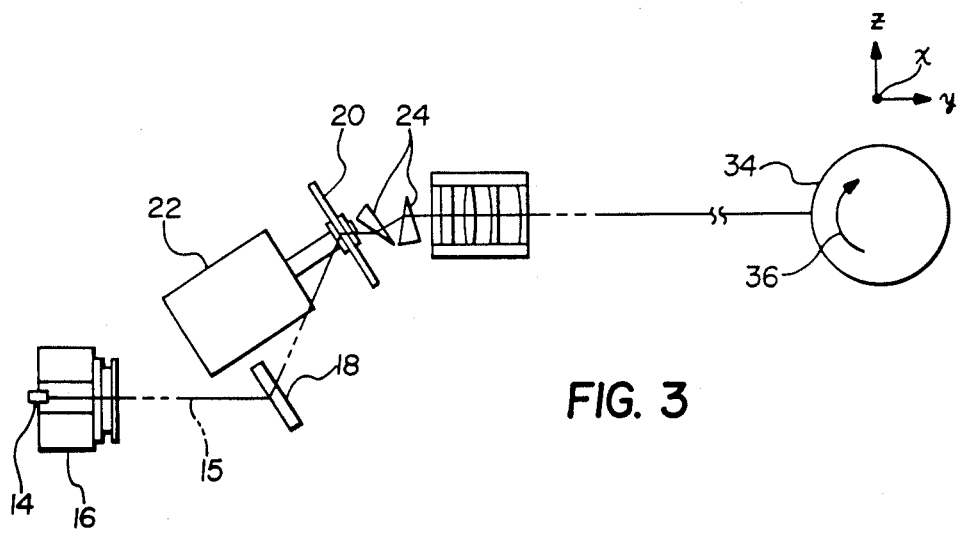
FIG. 3 is a diagrammatic representation of a holographic scanner system in which the present invention may be embodied.

Referring now to FIG. 3, there is illustrated a holographic laser beam scanning apparatus in which he present invention may be usefully embodied which is comprised of laser beam source 14 for generating a laser beam 15 that passes through beam collimating optics 16 to a stationary diffraction grating 18 which directs the beam to a rotating holographic beam scanner disk 20 sometimes referred to as a hologon spinner. Scanner disk or spinner 20 is comprised of a plurality of holographically produced diffraction grating facets 40 (FIG. 4) which cause beam 15 to be scanned in a nominally horizontal direction as the spinner 20 is rotationally driven by a high speed motor 22. The scanning beam 15 then passes through a pair of prisms 24 which serve as anamorphic optics for expanding the beam cross section dimension in the vertical or cross scan direction. The shaped, scanned beam 15 then passes through an f-θ lens which serves to focus the scanning beam onto a target represented by rotating drum 34. The horizontal scanning of beam 15 in the x-axis direction on the surface of drum 34 is actually along a line normal to the plane of the drawing while the vertical or cross scanning of the beam in the z-axis direction is achieved by rotation of the drum in the direction of arrow 36 to thus generate a two dimension raster scan. As thus far described, the construction and operation of holographic scanners such as system 10 of FIG. 1 are well known in the art and no further detailed discussion is considered necessary for an understanding of the present invention.

Figure 1:
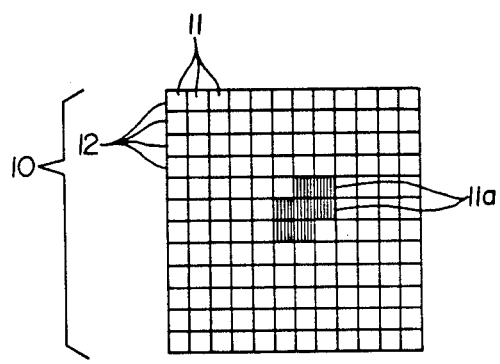
FIG. 1 is a diagram of a square halftone dot comprised of a matrix of pixel areas used in the explanation of the present invention.
Figure 2:
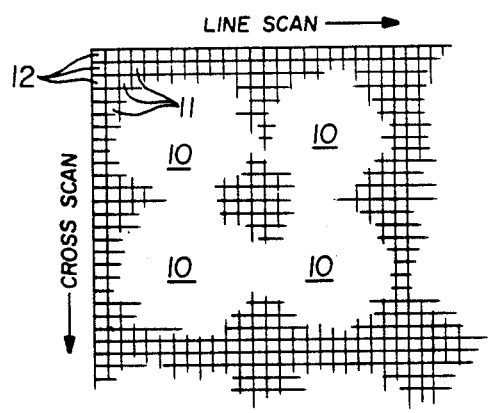
FIG. 2 is a diagram of a portion of a halftone dot image screen using the halftone dot configuration of FIG. 1.
Figure 4:
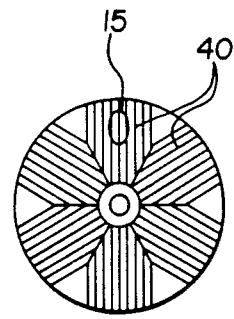
FIG. 4 is a view of a holographic scanner disk useful in the scanner system of FIG. 3.

When the scanner system of FIG. 1 is used to generate a halftone screen image, laser beam 15 is intensity modulated by a source of digitized data signals, not shown, to generate a two-dimensional array of halftone dots along the horizontal (x-axis) and vertical or cross-scan (z-axis) direction. The size of each of the dots determines the gray scale, in a black and white screen, or the color saturation level, in a color screen. In order to generate different size dots in a raster scanned screen, each of the dots is composed of a two dimensional matrix of pixel areas, the number of beam scan lines per dot determining the number of pixels in the cross-scan direction while the number of pixels in the line scan direction are determined by on-off modulation control of the beam by the data signal. For example, a typical image screen may have 150 dots per inch and each dot may made up of a $12 \times 12$ matrix of pixel areas. With this arrangement, the halftone screen is defined as having a halftone dot screen spatial frequency of 150 cycles per inch and a vertical pixel or scan line spatial frequency of $12 \times 150 = 1800$ cycles per inch. The "once-around" scanner frequency denotes the number of times per unit length that the any given scanning element or facet 40 on the spinner 20 completes a full revolution and is given by the ratio of the scan line frequency divided by the number of facets 40 on the spinner. In the present example, if the number of facets is 6, as shown in FIG. 4, the once-around frequency of the scanner is $1800/6 = 300$ cycles per inch.

As is known, the physical structure of the line scanner spinner 20, such as its diameter, the number of facets, the grating orientation and pitch of the hologram facets, etc., is selected to achieve desired operational characteristics, such as scan line width, duty cycle and scan line shape. Ideally, in producing the spinner, all of the facets would be made completely uniform. However, non-uniformities in facet-to-facet structure can occur that result in the generation of artifacts in the resultant image. For example, differences in diffraction efficiency between facets on the spinner will introduce intensity modulation of the scanning beam which, depending on the spatial frequency and magnitude thereof, can be visible as intensity variations in the resultant image. The degree to which the human eye can perceive these changes in intensity is dependent on the relative magnitude of the changes or modulation of the image and the spatial frequency at which the modulation occurs.

Figure 5:
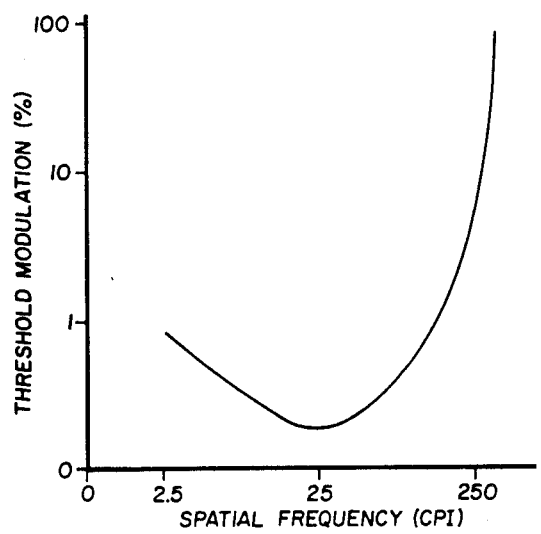
FIG. 5 is a graph of the threshold of visual sensitivity of the human eye to light/dark modulation of an image as a function of spatial frequency of the modulation.

This is illustrated in the graph of FIG. 5 which shows the variation in percent modulation of the image at the threshold of perception of the human eye as a function of spatial frequency. The trough of the curve represents the spatial frequencies of greatest sensitivity of the eye to variations in image detail This generally occurs in the region of 25 lines or cycles per inch. As the spatial frequency increases (image detail becomes finer) the eye becomes less sensitive at a rapidly increasing rate until, in the region of 250 cycles per inch and beyond, the eye is generally considered to lose its ability to resolve or see changes in detail at a normal viewing distance. Similarly, below 25 cycles per inch the eye again loses sensitivity to image modulation but at a lesser rate. Below about 2.5 cycles per inch and as the spatial frequency approaches 0 cycles per inch, the eye's ability to see such low spatial frequency diminishes to some threshold value corresponding to the eye's ability to resolve differences in shades of gray or in levels of color saturation in a uniform field. Although there is no sharp demarcation between the visible vs. non-visible spatial frequency spectrum, it can be said generally that image modulation that falls outside the spatial frequency limits of about 2.5 to 250 cycles per inch are imperceptible to the human eye. Obviously even within these spatial frequency limits, it is apparent that the threshold ability to perceive image modulation depends on the magnitude of the variations.

Moiré banding in a raster scanned halftone image is created by the beat frequencies that occur between the halftone dot screen frequency and the perturbations introduced by the line scanner at the once-around scanner frequency, or multiples of the once around scanner frequency. Mathematically, the process can be represented, approximately, as a multiplication of two cosine (or sine) functions. One function represents the halftone dot screen frequency which is used to modulate the laser beam source 14. The other represents the frequency impressed on the laser beam intensity by the cosinusoidal variation of diffraction efficiency, in the example under consideration, as the holographic scanner rotates 20. The laser halftone modulation can be represented by the expression:

$$W + X \cos A \tag{1}$$

where W is the DC or zero frequency component, X is the amplitude and A represents halftone dot screen spatial frequency. The hologon efficiency variation can be represented by the expression:

$$Y + Z \cos B \tag{2}$$

where Y is the DC component, Z is the amplitude and B is the once around scanner frequency. Multiplying the two together gives the expression:

$$(W+X\cos A)(Y+Z\cos B) = WY + XY\cos A + WZ\cos B + (\tfrac{1}{2})XZ\cos(A+B) + (\tfrac{1}{2})XZ\cos(A-B) \tag{3}$$

As explained above, the DC component (WY) may create a level shift, however, it does not produce a moiré modulation pattern since these are created by sum and difference beat frequencies between the halftone dot screen frequency and the scanner frequency. Since, in a completely uniform scanner, the amplitude variation in diffraction efficiency represented by the Z component goes to zero, the last three terms of Eq. (3) also go to zero for this ideal condition. These terms represent the once-around scanner frequency and the moire-producing beat frequencies.

In most practical cases, the sum frequency component (A+B) will fall outside the visible spatial frequency spectrum above 250 cycles per inch. Visible moiré modulation patterns will usually be produced by the fundamental and first harmonic difference frequency components (A-B), (2A-B), (A-2B) and (2A-2B). Unless special and costly provision is taken to produce a completely uniform scanner disk, these difference beat frequency moiré patterns will be produced and are likely to be visible in the resultant image. However, by proper selection of the scanner design relative to a given halftone dot screen frequency image, any moiré patterns that are produced can be made imperceptible to the human eye. In accordance with the invention, this is done by selecting the number of scanning elements in the scanner relative to the scan lines per dot and the screen frequency, e.g. the number of hologram facets in the scanner apparatus of FIG. 3, to be that number that makes the once around scanner frequency and the screen frequency related by an integral factor and also makes any beat frequencies between the scanner and screen frequency either fall outside the visible spatial frequency spectrum or be equal to the screen frequency. By so selecting the number of scanner elements, any non-uniformities in the scanner will not produce perceptible moiré patterns and less costly scanner production can be utilized.

Figure 6:
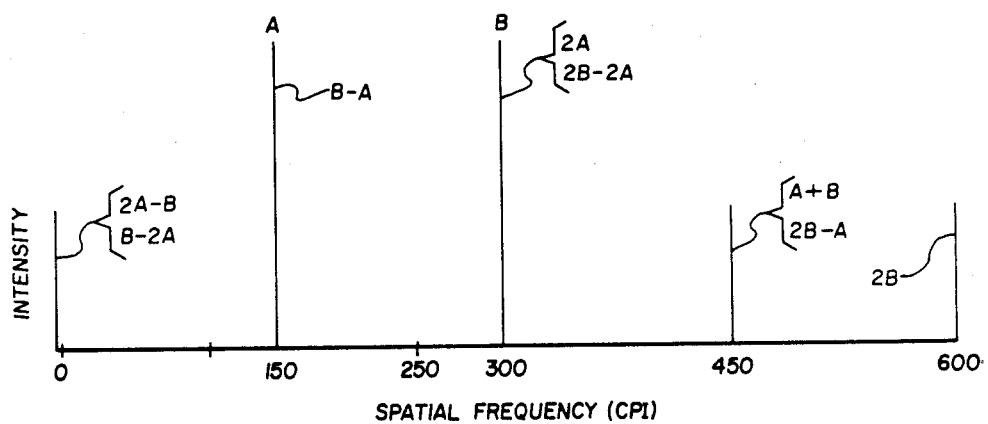
FIGS. 6 and 7 are spatial frequency graphs illustrating fundamental frequency and beat frequency components produced in a multiple line scan per dot raster scanned halftone dot image screen and which are useful in explaining the present invention.

This is illustrated in the spatial frequency graph of FIG. 6 which shows the beat frequency components generated by the 6 facet scanner apparatus of FIG. 3 wherein the letters A and B are the screen and scanner frequencies of Eq.(3) and 2A and 2B are the first harmonics, thereof. As can be seen, all sum and difference beat frequency components fall outside the visible spatial frequency spectrum (the 0 frequency being considered to be below the visible spectrum) except for the component B-A at 150 cycles per inch. However, this component is equal to the screen frequency A and consequently the moiré pattern it generates is buried in the half tone dot screen pattern and thus effectively is imperceptible to the eye.

Figure 7:
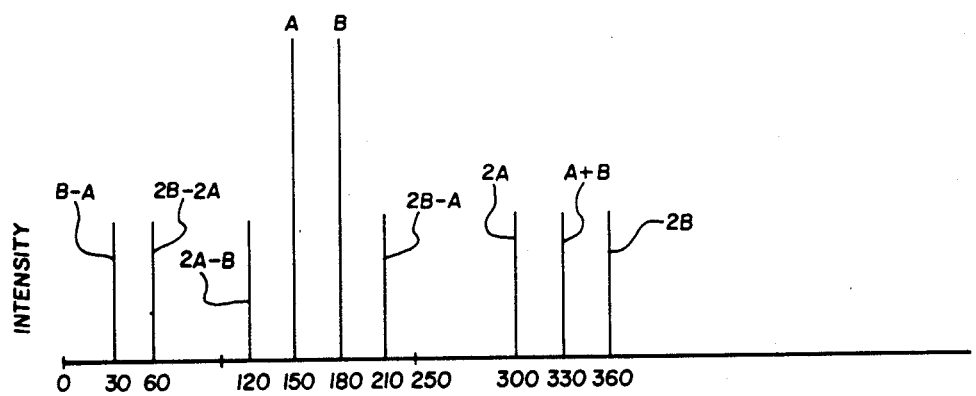

In FIG. 7, there is illustrated the consequence of selecting a number of scanner facets which does not meet the criteria described above. More specifically, when a disk with ten facets is substituted for the six facet disk the once around scanner frequency becomes 1800/10=180 cpi. It is readily apparent from this graph that a number of the moiré-producing beat frequency components fall in the visible spectrum below 250 cycles per inch, the most prominent of which is the difference frequency B-A. This is because it falls close to 25 cycles per inch in the region of greatest sensitivity of the eye to image modulation and also because it is a combination of the relatively high amplitude fundamental scanner and screen frequencies. The remaining beat frequencies involve lower amplitude harmonics of the scanner and screen frequencies and also fall farther away from the most sensitive visibility region. Thus perception of these moiré patterns will depend on the amplitude of the beat components and whether they are high enough to rise above the percent modulation threshold of FIG. 5.

A number of examples to illustrate the implementation of the invention may be developed. In general the relationship between the once around scanner frequency $f_s$ and the halftone dot screen frequency $f_d$ may be expressed as:

$$f_s = \frac{p}{n} f_d \tag{4}$$

where the letter "p" denotes the number of scan lines per halftone dot and "n" denotes the number of line scanning elements. Thus, by appropriate selection of the number of scanning elements "n" to be integrally divisable into "p" or to be integrally divisable by "p", the scanner frequency and dot screen frequency are related by an integral factor such that $f_s$ is an integral multiple of $f_d$ if "n" is less than or equal to "p" and visa versa if "n" is greater than "p". In the former case, difference beat frequencies between $f_s$ and $f_d$ and between first harmonics of $f_s$ and $f_d$ are always either outside the visible spatial frequency spectrum of 2.5–250 lines (or cycles) per inch or else they fall on the screen frequency in the visible spectrum and are thus imperceptible.

However, in the case where "n" is greater than "p" (2×, 3× etc), "n" must be selected in relation to the values of "p" and $f_d$ such that the scanner frequency $f_s$ is always greater than the upper limit of the visible spatial frequency spectrum. This is so that in all such cases the fundamental and first harmonic difference beat frequencies will meet the criteria of being either outside the visible spectrum or falling on the screen frequency. Not all choices of "n" integrally greater than "p" for given values of "p" and $f_d$ will meet this criteria.

Examples of implementation of the invention are illustrated in the following charts which also include examples that do not meet the "n" selection criteria so as to illustrate the adverse effects thereof.

| | Examples | | | | | |
|---|---|---|---|---|---|---|
| | 1 | 2 | 3 | 4 | 5 | 6 |
| Input Factors | | | | | | |
| p = | 8 | 8 | 8 | 8 | 8 | 8 |
| n = | 4 | 6 | 8 | 16 | 16 | 8 |
| $f_d$ = | 300 | 300 | 300 | 300 | 600 | 150 |
| $f_p = p \times f_d$ | 2400 | 2400 | 2400 | 2400 | 4800 | 1200 |
| $f_s = f_p/n$ | 600 | 400 | 300 | 150 | 300 | 150 |
| Diff. Beat Frequencies | | | | | | |
| $f_d - f_s$ | 300 | 100 | 0 | 150 | 300 | 0 |
| $2f_d - f_s$ | 0 | 200 | 300 | 450 | 900 | 150 |
| $f_d - 2f_s$ | 900 | 500 | 300 | 0 | 0 | 150 |
| $2f_d - 2f_s$ | 600 | 200 | 0 | 300 | 600 | 0 |

In this chart, the effect of different "n" selection and screen frequencies $f_d$ for a screen with a fixed number of scan lines (8) is illustrated. In the last four lines of the chart, the difference beat frequencies for each example are shown. Thus in examples 1 and 3, in which "n" is selected to be integrally divisible into "p" (i.e. the ratio of p/n is an integer) the beat frequencies are all higher than the 250 cpi upper limit of the visible spectrum. However, for example 2, in which the ratio of p/n is not an integer, two beat frequency components are generated within the visible spectrum at 100 cpi and 200 cpi which can produce perceptible moiré banding.

Example 4 illustrates a case in which "n" is integrally greater than "p", (2×), which happens to result in the generation of a beat frequency component (150 cpi) in the visible spectrum. However, as illustrated by Example 5 the same ratio of p/n, i.e. n=2p, (n−2p) is effective in a scanner system for generating a dot screen frequency of 600 cpi (compared with 300 cpi in Example 4) to keep the beat frequency components outside the visible spectrum. It should be noted that in Example 4 the scanner frequency of 150 cpi is below the upper limit of the visible spectrum whereas in Example 5, it is higher at 300 cpi. Thus, if it is desired to use a number of scanning elements greater than the number of scan lines per dot (for higher scanning rates, etc.), moiré will be rendered imperceptible only in cases in which the number of scanning elements, "n", is selected in relation to both of the factors "p" and $f_d$ such that the resultant scanner frequency $f_s$ is higher than the upper limit of the visible spectrum.

Example 6 illustrates that even if a moderate resolution dot screen frequency of 150 cpi is employed, "n" can be selected to make the beat frequency components imperceptible at 0 cpi or by falling on the screen frequency (150 cpi).

A more generalized criteria for selection of the "n" factor for a given "p" and $f_d$ can be demonstrated from the expression for the difference beat frequencies $$xf_d - yf_s \tag{5}$$

where x and y are the harmonic factors wherein x=y=1 are the fundamental frequencies and x=Y=2 are the first order harmonics of the dot screen frequency and the scanner frequency, respectively. Substituting the value of $f_s$ from expression (4) gives the following expression for the resultant beat frequencies produced:

$$f_d[x-y(p/n)] \tag{6}$$

From expression (6), a chart of multiplier values in terms of the ratio p/n can be developed as shown below, wherein the numbers in the body of the chart represent the absolute values of the bracketed segment of expression (6):

| Ratio p/n: | 2 | 1 | ½ | ⅓ |
|---|---|---|---|---|
| x = 1 y = 1: | 1 | 0 | ½ | ⅔ |
| x = 2 y = 1: | 1 | 1 | 1½ | 1⅔ |
| x = 1 y = 2: | 3 | 1 | 0 | ⅓ |
| x = 2 y = 2: | 2 | 0 | 1 | 1⅓ |

By multiplying the value from the chart against the dot screen frequency, $f_d$, the resultant beat frequencies are determined. It will therefore be appreciated that for a system with a predetermined number of scan lines "p" and screen frequency $f_d$, "n" may be selected to make any resulting moiré imperceptible in the image screen by assuring that the resulting beat frequencies are either outside the visible spectrum (either 0 or higher than 250 cpi or fall on the screen frequency (factor=1 in the chart) if the screen frequency is in the visible spectrum. If it is desired to use an "n" value greater than the value for "p", (i.e. the last two columns in chart (6)), "n" must be selected such that the factor in the chart times the screen frequency $f_d$ does not result in any beat frequency values that come within the visible spectrum, other than on the dot screen frequency itself. This requirement will always be satisfied if "n" is selected relative to "p" and $f_d$ such that the resulting scanner frequency value is higher than the upper limit of the visible spectrum.

What has been considered up to now is a single source multifaceted scanner with moiré banding induced by facet-to-facet intensity error. Moiré banding due to line position error also occurs and is typically caused by wobble and facet-to-facet pyramidal error in a polygon mirror scanner and facet-to-facet grating pitch error in a hologon scanner. These errors result in bunching and spreading of scan lines which appear in the print as dark and light bands, respectively. The eye interprets variation in area coverage as a variation in density. Because position errors appear as intensity errors, there can be moiré beat frequencies appearing as the sum and difference frequencies between the scanner position error spatial frequencies and the halftone screen frequency. Proper choice of the number of facets in relation to the number of line scans comprising the halftone dot can be used to suppress moiré banding from position errors as well as intensity errors as described above.

Figure 8:
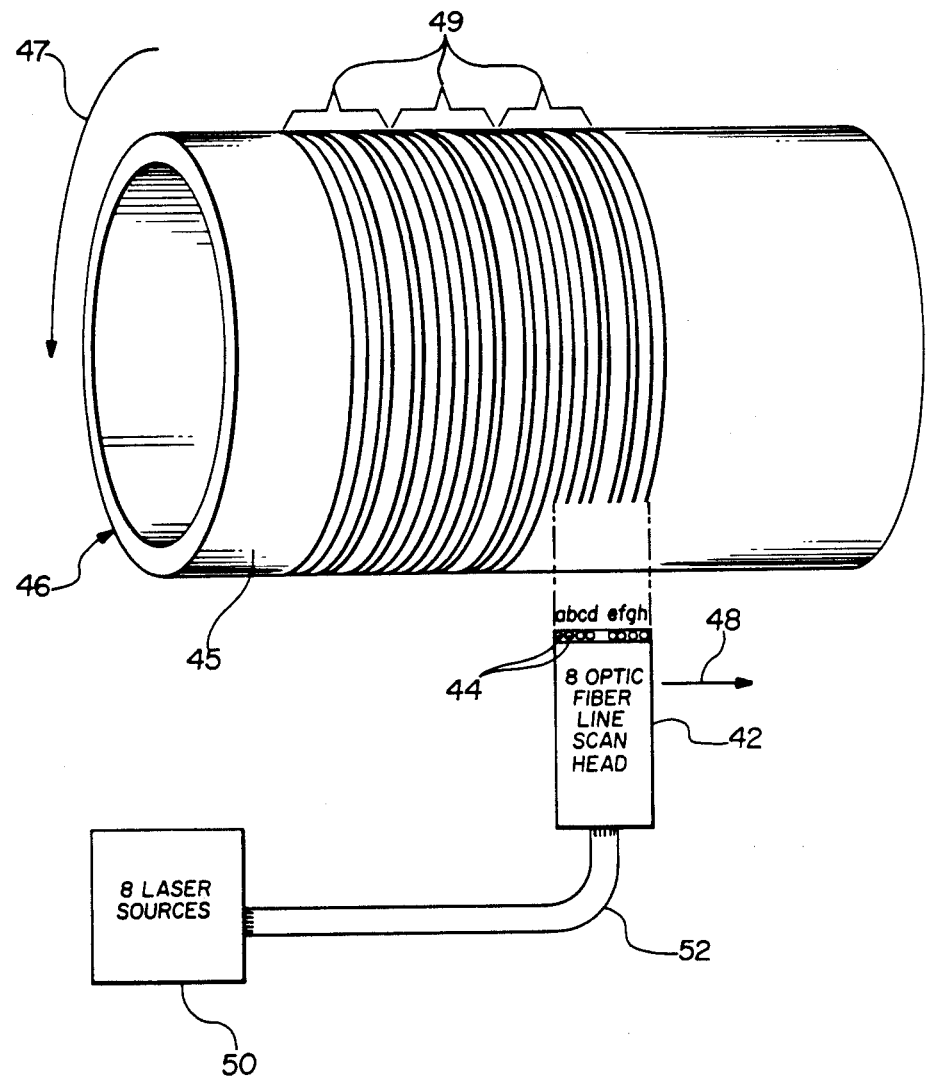
FIG. 8 is a schematic representation of a fiber optic line scanner utilizing a multi-source, multi-element parallel line scanning head in which the present invention may be embodied.

Other types of halftone dot screen printers, those using multiple source heads, are subject to repetitive intensity errors and position errors. Examples are fiber optic heads, multiple light emitting diodes (LED's), and ink jet print heads. Instead of writing or scanning one line at a time, these heads are used to write multiple lines of an image simultaneously. As a specific example, FIG. 8 illustrates scanner apparatus utilizing a multi-element head 42 with eight optical fibers 44 which write eight lines at a time of an image. A photoreceptor target surface 45 is mounted on a drum 46 and the drum is rotated while the head is translated as represented by arrows 47 and 48, respectively. The image is constructed by scanning successive eight line segments. A plurality of laser sources 50 are driven by a data signal source (not shown) and are coupled via a multi-fiber optic cable 52 to head 42.

The light output of the fibers may not be exactly matched in terms of intensity or there may be errors in position of the written lines due to eccentricity of the fiber cladding and non-concentricity of the core with the cladding. These intensity or position errors will appear as repetitive banding in the image as shown by repeating patterns. For an eight fiber head, the banding pattern repeats every eight scan lines, as shown by patterns 49, the equivalent of the once around frequency seen with an eight facet rotating scanner. Of course, fiber to fiber variations within the head will appear at higher frequencies, generally multiples of the once around scanner frequency. The scanner in FIG. 8 shows a simple case in which the spacing between fibers d and e is larger than normal, providing a repeating pattern at the once around rate when writing a continuous tone image of a constant gray level. When writing a halftone image where the halftone dots are constructed of pixel areas, there will be a moiré beat occurring at the sum and difference between the fiber head once around frequency (and other fiber spacing error frequencies) and the halftone screen frequency. These beats will appear as banding where the bands are oriented in the same direction as the scan lines.

Proper choice of the number of fibers in the head, given the number of scan lines per halftone dot and a predetermined halftone dot screen frequency, will result in the once around banding and the moiré banding occurring either above or below the eye sensitivity range or at the halftone screen frequency. It will be apparent to those skilled in the art that the above principles can also be extended to ink jets, LED arrays, laser arrays, electro optic modulated channel device heads and other multiple element writing sources.

There has been described two general classes of printers that come within the scope of the invention; single source printers with multifaceted rotating scanners, and multiple source writing heads. Both can suffer from once around and multiples of once around banding related to intensity errors or line position errors caused by the line scanning device. These banding frequencies will appear in a continuous tone image. In a halftone image where multiple scans are used to create the halftone dot, these banding frequencies will beat with the halftone screen frequencies to form additional moiré banding at the sum and difference of the respective frequencies. Moiré banding can be rendered essentially invisible for both classes of printers and both types of errors by the appropriate choice of the number of facets or sources with respect to the number of lines used to create the halftone dot.

The invention has been described in detail with particular reference to a presently preferred embodiment, but it will be understood that variations and modifications can be effected within the spirit and scope of the invention.

What is claimed is:

1. Improved scanning apparatus comprised of a pixel-writing line scan device having a plurality of line scanning elements adapted to produce a raster scanned halftone dot image screen in which each dot area is comprised of a plurality of pixel areas equal to the number of scan lines per dot in the cross scan direction times the number of intensity modulation pixels generated in the line scan direction, the halftone screen having, in the cross-scan direction, (i) a predetermined dot screen spatial frequency and (ii) a scan line spatial frequency equal to the number of scan lines per dot times the screen spatial frequency, the apparatus further having a once around scanner frequency equal to the ratio of the scan line frequency divided by the number of line scanning elements in the writing device, the improvement comprising:

the number of line scanning elements being that number that makes either the once around scanner frequency or the screen frequency an integral multiple of the other and makes beat frequencies between the scanner frequency and screen frequency either fall outside spatial frequency spectrum visible to the human eye or be equal to the screen frequency thereby rendering cross-scan moiré banding in the image substantially imperceptible to the human eye.

2. Improved scanning apparatus comprised of a pixel-writing line scan device having a plurality of line scanning elements adapted to produce a raster scanned halftone dot image screen in which each dot area is comprised of a plurality of pixel areas equal to the number of scan lines per dot in the cross scan direction times the number of intensity modulation pixels generated in the line scan direction, the halftone screen having, in the cross-scan direction, a predetermined dot screen spatial frequency, $f_d$, equal to the number of dots per unit length, the apparatus further having a once around scanner frequency equal to $f_d \times p/n$, wherein the letter "p" is the number of scan lines per dot and "n" is the number of line scanning elements in the writing device, the improvement comprising:

the number of scan lines per dot "p" and the number of line scanning elements "n" being related by an integral factor and, in any case in which "n" is greater than "p", the scanner frequency is greater than the upper limit of spatial frequency spectrum visible to the human eye.

3. The improvement of claims 1 or 2 in which the pixel-writing device is a rotating holographic beam scanner and the line scanning elements are diffraction grating facets on the rotating beam scanner.

4. The improvement of claims 1 or 2 in which the pixel-writing device is an optical fiber writing head having a plurality of light source driven optical fibers for simultaneously writing a plurality of line scans progressing repetitively in cross-scan direction.

5. The improvement of claims 1 or 2 in which the pixel-writing device is a rotating beam scanning polygon mirror having a plurality of mirror facets.

* * * * *